(12) United States Patent
Bieber (10) Patent No.: US 11,660,638 B2
(45) Date of Patent: May 30, 2023

(54) WIDE BANDWIDTH CIRCULAR FORCE GENERATOR DEVICES, SYSTEMS, AND METHODS

(71) Applicant: LORD Corporation, Cary, NC (US)

(72) Inventor: Martin Bieber, Oak Island, NC (US)

(73) Assignee: LORD Corporation, Cary, NC (US)

( * ) Notice: Subject to any disclaimer, the term of this patent is extended or adjusted under 35 U.S.C. 154(b) by 304 days.

(21) Appl. No.: 16/959,351

(22) PCT Filed: Mar. 20, 2019

(86) PCT No.: PCT/US2019/023081
§ 371 (c)(1),
(2) Date: Jun. 30, 2020

(87) PCT Pub. No.: WO2019/183165
PCT Pub. Date: Sep. 26, 2019

(65) Prior Publication Data
US 2021/0060613 A1 Mar. 4, 2021

Related U.S. Application Data

(60) Provisional application No. 62/645,369, filed on Mar. 20, 2018.

(51) Int. Cl.
*B06B 1/16* (2006.01)
*H02K 11/215* (2016.01)
*H02K 7/06* (2006.01)
*B60N 2/50* (2006.01)

(52) U.S. Cl.
CPC ............. *B06B 1/166* (2013.01); *H02K 7/061* (2013.01); *H02K 11/215* (2016.01); *B60N 2/501* (2013.01); *F16F 2232/02* (2013.01)

(58) Field of Classification Search
CPC ....... H02K 7/061; H02K 11/215; B06B 1/166
USPC .......................... 310/114, 154.33; 74/570.21
See application file for complete search history.

(56) References Cited

U.S. PATENT DOCUMENTS

| 5,467,653 A | 11/1995 | Lulay |
| 2015/0370266 A1 | 12/2015 | Norris et al. |

FOREIGN PATENT DOCUMENTS

| EP | 0 389 210 A2 | 9/1990 | |
| EP | 0 409 462 A1 | 1/1991 | |
| EP | 0 578 939 A1 | 1/1994 | |
| EP | 409462 B1 * | 5/1994 | ............. F16F 15/22 |
| JP | H03149430 A | 6/1991 | |

(Continued)

OTHER PUBLICATIONS

Canadian Office Action for Application No. 3087866 dated Nov. 5, 2021.

(Continued)

*Primary Examiner* — Jose A Gonzalez Quinones
(74) *Attorney, Agent, or Firm* — KDW Firm PLLC (57) ABSTRACT

Circular force generator devices (100), systems, and methods for damping vibrations which include two complementary rotor assemblies (110, 120) that are rotatable together about a common shaft (102) but that have an adjustable rotational position (P1, P2) with respect to one another such that a significant reduction in rotor inertia and bearing drag relative to conventional CFG configurations is provided. The present architecture creates virtually zero rotating moment.

13 Claims, 8 Drawing Sheets

(56) References Cited

FOREIGN PATENT DOCUMENTS

| | | | |
|---|---|---|---|
| JP | 2011239533 A | 11/2011 |
| JP | 7114727 B2 | 8/2022 |
| WO | WO 2019/183165 A1 | 9/2019 |

OTHER PUBLICATIONS

Japanese Office Action for Application No. 2020550730 dated Nov. 24, 2021.
International Search Report and Written Opinion for Application No. PCT/US2019/023081 dated Jul. 1, 2019.
Canadian Notice of Allowance for Application 3087866 dated Sep. 15, 2022.

\* cited by examiner

WIDE BANDWIDTH CIRCULAR FORCE GENERATOR DEVICES, SYSTEMS, AND METHODS

CROSS-REFERENCE TO RELATED APPLICATIONS

This application claims the benefit of U.S. Provisional Patent Application Ser. No. 62/645,369, filed Mar. 20, 2018, the disclosure of which is incorporated herein by reference in its entirety.

TECHNICAL FIELD

The subject matter herein generally relates to the design and operation of force generators (FGs) or actuators used to reduce vibration in vehicles. The subject matter herein more particularly relates to wide bandwidth circular force generator devices, systems, and methods.

BACKGROUND

Circular force generators (CFGs) are used on some types of mechanical structures to produce vibratory loads for the purposes of reducing or offsetting vibration in the structures. In certain applications in which the CFG must track a reference whose frequency varies rapidly and/or varies over a wide range. However, rotor inertia can cause undesirable power consumption or regeneration during rotor acceleration or deceleration. In addition, for CFG applications which must operate at relatively high frequencies, bearing drag can lead to further unwanted power consumption. In addition, the relative alignment of CFG rotors can create a rotating moment, which can be undesirable in CFG applications that are designed to reduce vibration to very low levels.

Accordingly, a need exists for improved CFG devices, systems, and methods, which are operable to control vibration while mitigating these effects.

SUMMARY

In one aspect, a circular force generator includes a first rotor assembly and a second rotor assembly. The first rotor assembly includes a first spinning bearing mounted about a shaft at a first position and a first eccentric mass extending in a first axial direction away from the first position. The second rotor assembly includes a second spinning bearing mounted about the shaft at a second position that is spaced apart in the first axial direction from the first position, and a second eccentric mass extends in a second axial direction away from the second position, wherein the second axial direction is opposite the first axial direction. The first eccentric mass and the second eccentric mass are each rotatable about the shaft to generate a combined rotating force. A relative angular position between the first eccentric mass and the second eccentric mass is selectively adjustable to change a magnitude and a phase of the combined rotating force.

In another aspect, circular force generator includes a first rotor assembly that includes a first spinning bearing mounted about a shaft at a first position, a first eccentric mass extending in a first axial direction away from the first position, and a first phase-shifting bearing connected to the first eccentric mass at a second position that is spaced apart in the first axial direction from the first position. The circular force generator also includes a second rotor assembly that includes a second spinning bearing mounted about the shaft at or near the second position and rotatably coupled to the first phase-shifting bearing, a second eccentric mass extending in a second axial direction away from the second position, where the second axial direction is opposite the first axial direction, and a second phase-shifting bearing connected to the second eccentric mass and rotatably coupled to the first spinning bearing at or near the first position. The first eccentric mass and the second eccentric mass are each rotatable about the shaft to generate a combined rotating force. A first center of mass of the first eccentric mass rotates in a first path about the shaft, a second center of mass of the second eccentric mass rotates in a second path about the shaft, and the first path and the second path are substantially coplanar. The first phase-shifting bearing and the second phase-shifting bearing allow for selective adjustment of a relative angular position between the first eccentric mass and the second eccentric mass to change a magnitude and a phase of the combined rotating force.

In yet another aspect, a method of generating a circular force includes mounting a first rotor assembly about a shaft, the first rotor assembly including a first spinning bearing mounted about the shaft at a first position and a first eccentric mass extending in a first axial direction away from the first position. The method further includes mounting a second rotor assembly about the shaft, the second rotor assembly including a second spinning bearing mounted about the shaft at a second position that is spaced apart in the first axial direction from the first position, and a second eccentric mass extending in a second axial direction away from the second position, where the second axial direction is opposite the first axial direction. The method further includes rotating the first eccentric mass and the second eccentric mass about the shaft to generate a combined rotating force, and adjusting a relative angular position between the first eccentric mass and the second eccentric mass to change a magnitude and a phase of the combined rotating force.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

DETAILED DESCRIPTION

Figures (also "FIGS.") 1A to 7 illustrate various aspects, views, and/or features associated with improved circular force generator devices, systems, and/or methods. The improved circular force generator devices, systems, and/or methods are usable with numerous vibration damping applications. For example, the vibration damping applications may include seating in various commercial vehicles, such as off-highway equipment, cars, trucks, boats, off-road devices, or construction vehicles. The improved circular force generator devices and systems described herein damp vibrations associated with operation of vehicles so that vehicle occupants experience a safer and gentler ride in the vehicle, regardless of an operating state of the vehicle. Other applications include any situation where unwanted or excessive vibrations exist that are needing to be damped. An example is to use the invention to reduce vibrations on and in an aircraft seat. Other uses of the invention may include reducing the vibration resulting from any engine propelling a vehicle or driving machinery. Example platforms include as aircraft, boats, industrial equipment, etc.

In some embodiments, the improved circular force generator devices, systems, and methods disclosed herein are configured to provide a significant reduction in rotor inertia and bearing drag relative to conventional CFG configurations, and some embodiments of the present architecture create virtually zero rotating moment. To achieve these benefits, in some embodiments, a CFG device, generally designated 100, includes a first rotor assembly 110 and a complementary second rotor assembly 120 that are rotatable together about a common shaft 102 but that have an adjustable rotational position with respect to one another.

Figure 1A:
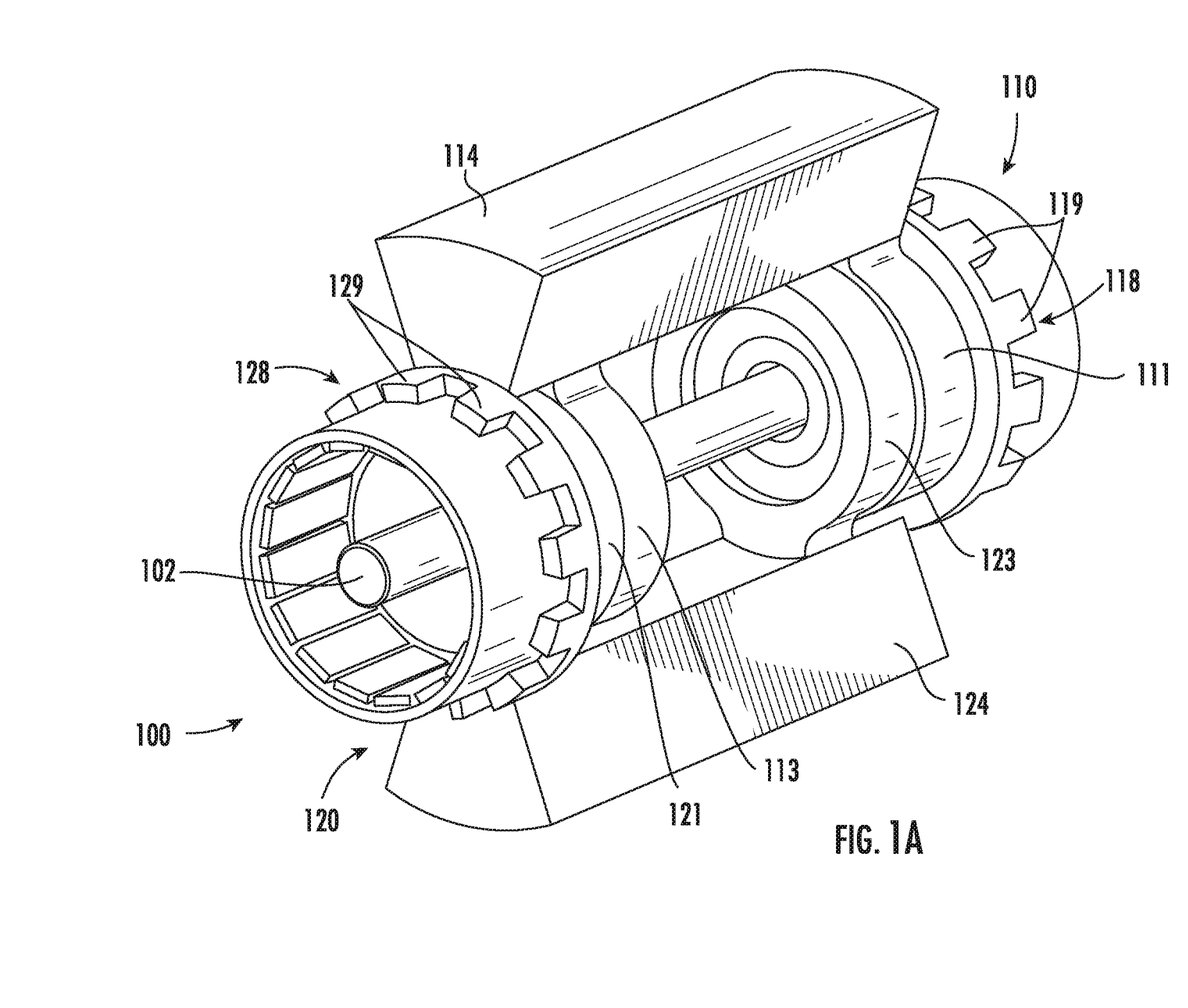
FIG. 1A is a perspective side view of rotating assemblies of an exemplary circular force generator.
Figure 1B:
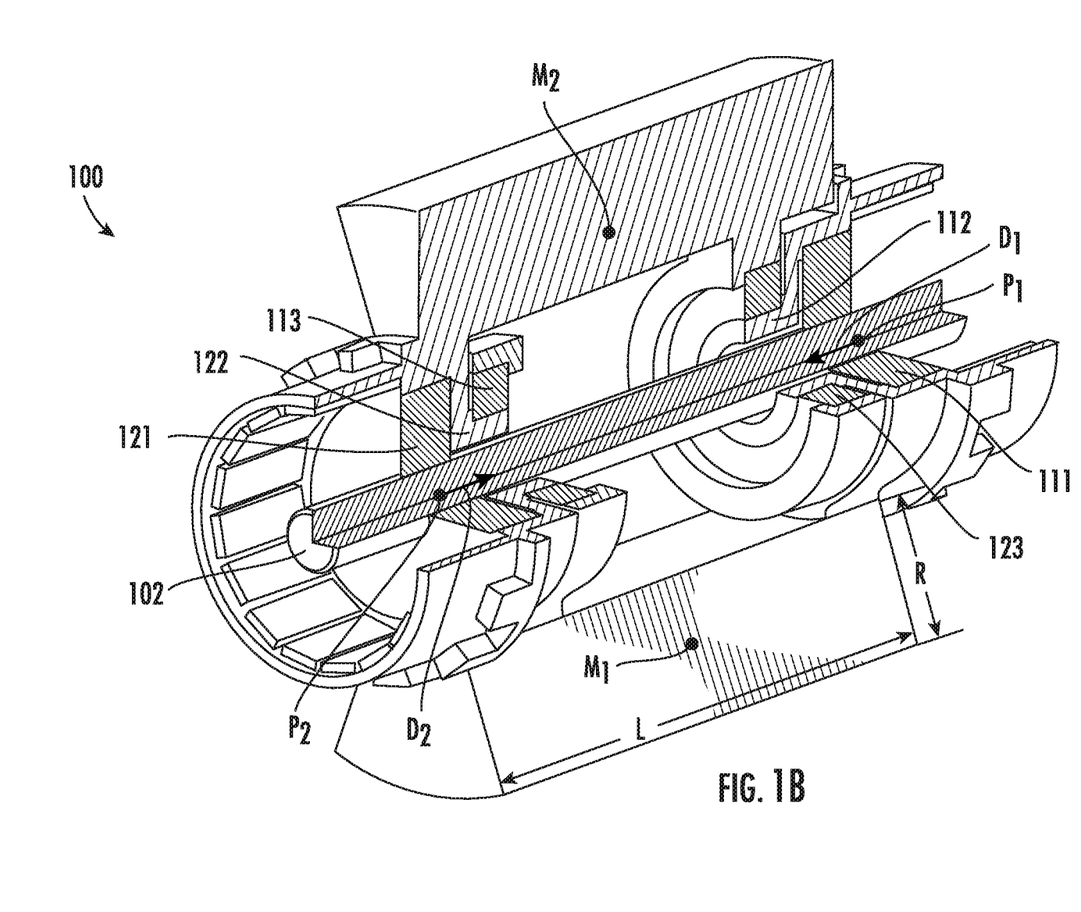
FIG. 1B is a cutaway perspective side view of the rotating assemblies of the exemplary circular force generator shown in FIG. 1A.
Figure 2:
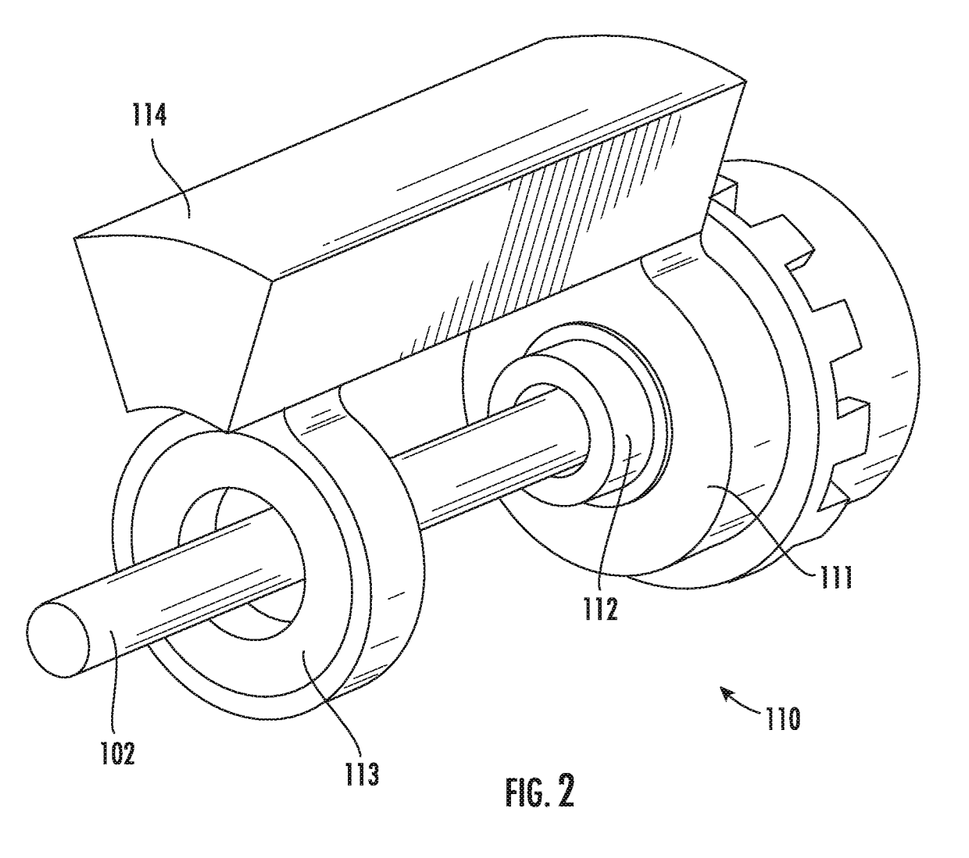
FIG. 2 is a perspective side view of a rotor assembly of the exemplary circular force generator.
Figure 3:
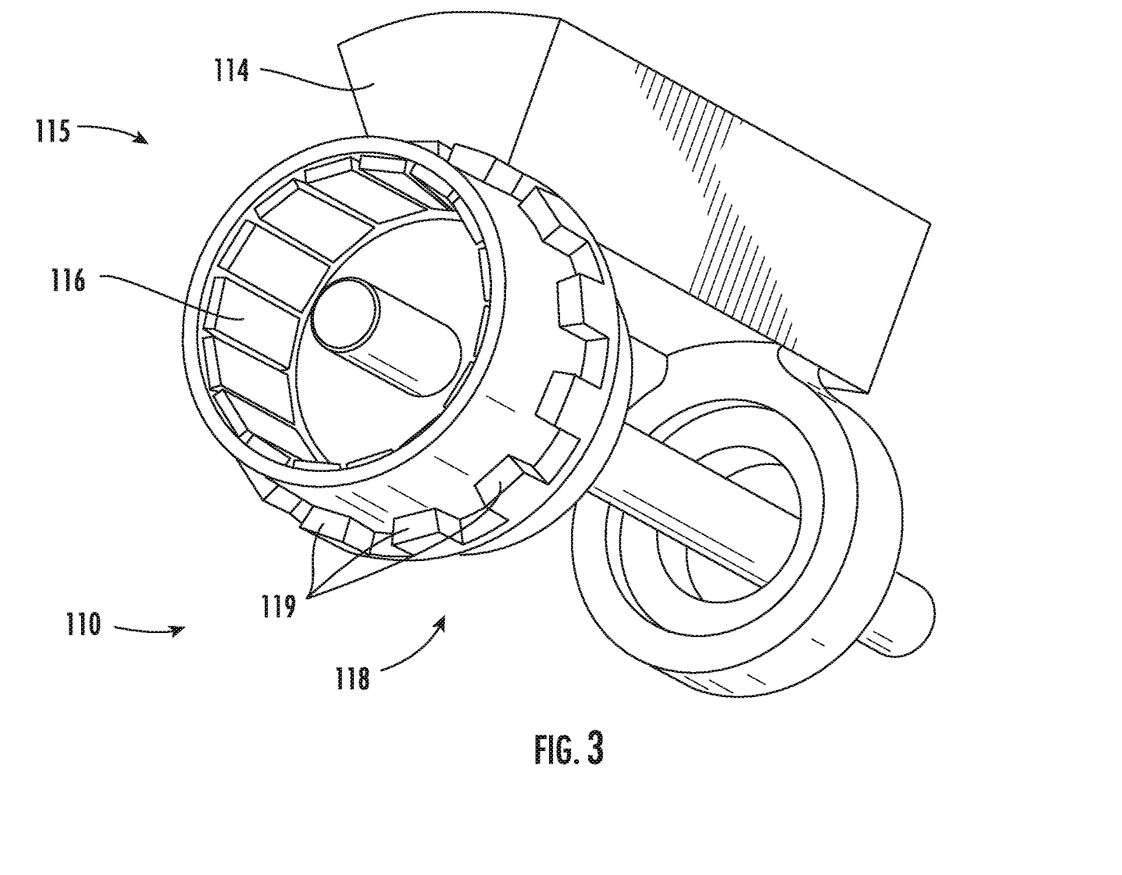
FIGS. 3 and 4 are perspective end views of the rotor assembly of the exemplary circular force generator.
Figure 4:
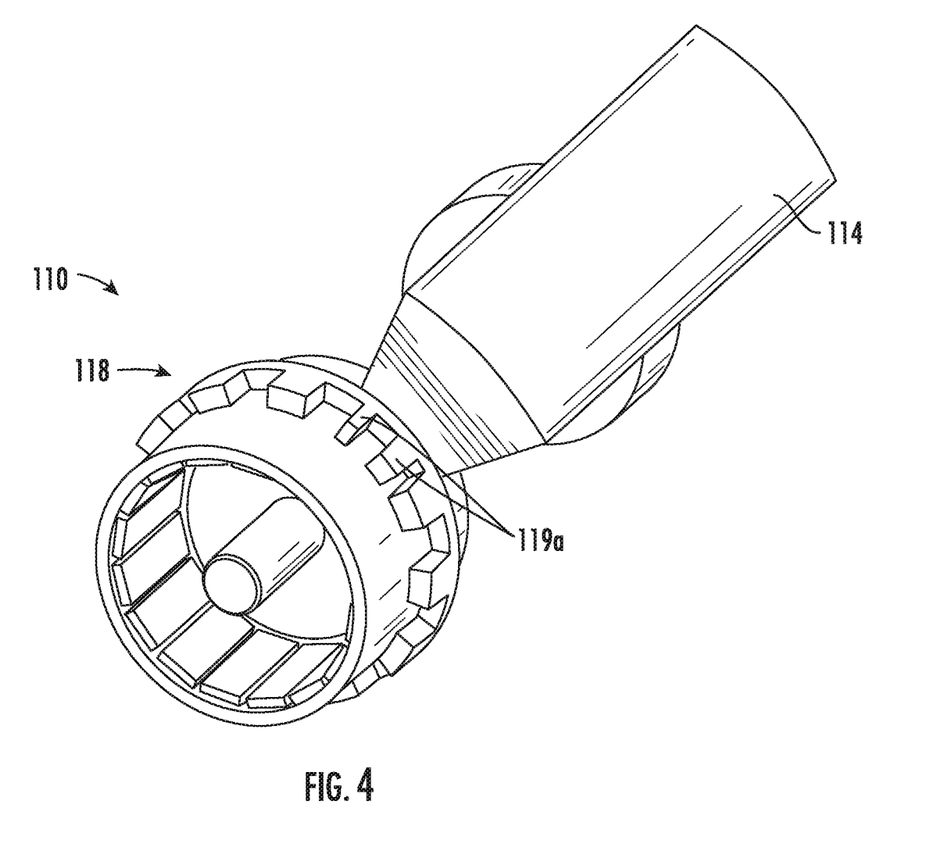

As illustrated in FIGS. 1A through 2, in some embodiments, first rotary assembly 110 of circular force generator device 100 includes a first spinning bearing 111 mounted about shaft 102 at a first position P1, and a first eccentric mass 114 extends in a first axial direction D1 away from first position P1. In some embodiments, first spinning bearing 111 is a precision, single-row, radial ball bearing, although those having ordinary skill in the art will appreciate that any of a variety of other bearing types or configurations can be used to satisfy design considerations of a particular application. In some embodiments, first eccentric mass 114 has a relatively large axial length L and a relatively small radius R, resulting in a lower rotor inertia compared to conventional CFG configurations. For example, when designing a CFG for this type of application, it can be advantageous to use the smallest bearings that can handle the loads required for a given implementation, and the size of the bearing limits the inner radius of the mass in some situations. Conversely, it can also be desirable for the first eccentric mass to have an axial length that is as long as can be packaged in the application. This optimization of length minimizes the outer radius of the first eccentric mass while still satisfying requirements for the location of the center of mass or for the force capability. In some embodiments, these design considerations result in the axial length of first eccentric mass 114 being at least 1.5 times the outer radius of first eccentric mass 114, although those having ordinary skill in the art will recognize that the concepts disclosed herein are not limited to any particular ratio of the dimensions of first eccentric mass 114. In any configuration, variable speed power draw and/or regeneration is minimized by having a reduced moment of inertia of first rotor assembly 110.

In some embodiments, rotation of first eccentric mass 114 about shaft 102 is driven by a first motor 115 coupled to first rotor assembly 110 and configured to drive rotation of first eccentric mass 114 about shaft 102. In one embodiment illustrated in FIGS. 3 through 5, first motor 115 is a frameless annular motor having a first motor rotor 116 coupled to an end of first rotor assembly 110. In some embodiments, first motor rotor 116 is an element of an outrunner motor that is integrated into first rotor assembly 110. Alternatively, in other embodiments, first motor 115 is an (annular frameless) inrunner motor attached to first rotor assembly 110. In either configuration, the use of frameless annular motors helps to eliminate any motor bearing drag. In some embodiments, first motor 115 is selected from any of a variety of a motor types with inherently low torque ripple, such as a permanent-magnet synchronous motor (PMSM), synchronous reluctance motor (SynRM), or AC induction motor (ACIM), is used to minimize noise created by torsional harmonics.

In some embodiments, a first position sensor 117 in communication with first rotor assembly 110 is configured to identify a position of first eccentric mass 114 with respect to shaft 102. In some embodiments, first position sensor 117 is leveraged to provide high angular resolution in order to improve motor efficiency. Referring to the embodiments shown in FIGS. 3 through 5, in some embodiments, first position sensor 117 is a non-contact sensor that is associated with a first tone wheel 118 having a number of first teeth 119 mounted about the end of first rotor assembly 110, such as at or near first spinning bearing 111. In some embodiments, first position sensor 117 is a Hall effect device. In this arrangement, first position sensor 117 is configured to identify the position of first rotor assembly 110 based on the sensed position of first tone wheel 118. First tone wheel 118 is designed to have a sufficient number of first teeth or targets 119—depending on the motor type and specifications of first motor 115—to allow efficient motor commutation. In some embodiments, first tone wheel 118 incorporates first index teeth 119a to provide a once-per-revolution index which is aligned with first eccentric mass 114. In one embodiment illustrated in FIG. 4, first index teeth 119a are provided as two split teeth to provide such an index.

In some embodiments, second rotor assembly 120 is configured to have complementary features to first rotor assembly 110. In the embodiments illustrated in FIGS. 1A, 1B, and 6, second rotor assembly 120 has a second spinning bearing 121 configured to be mounted about shaft 102 at a second position P2 that is spaced apart in first axial direction D1 from first position P1. A second eccentric mass 124 extends in a second axial direction D2 away from second position P2, wherein second axial direction D2 is opposite from first axial direction D1. In some embodiments, second rotor assembly 120 is driven by a second motor 125 coupled to second rotor assembly 120, such as a second frameless annular motor coupled to an end of second rotor assembly 120, and second motor 125 is configured to drive rotation of second eccentric mass 124 about shaft 102. In some embodiments, a second position sensor 127, such as a hall-effect sensor associated with a second tone wheel 128, is in communication with second rotor assembly 120 and is configured to identify a position of second eccentric mass 124 with respect to shaft 102. In some embodiments, second tone wheel 128 includes a plurality of second teeth or targets 129. In some embodiments, second teeth 129 include one or more second index teeth, which can be similar in configuration to first index teeth 119a of first rotor assembly 110 illustrated in FIG. 4.

Figure 6:
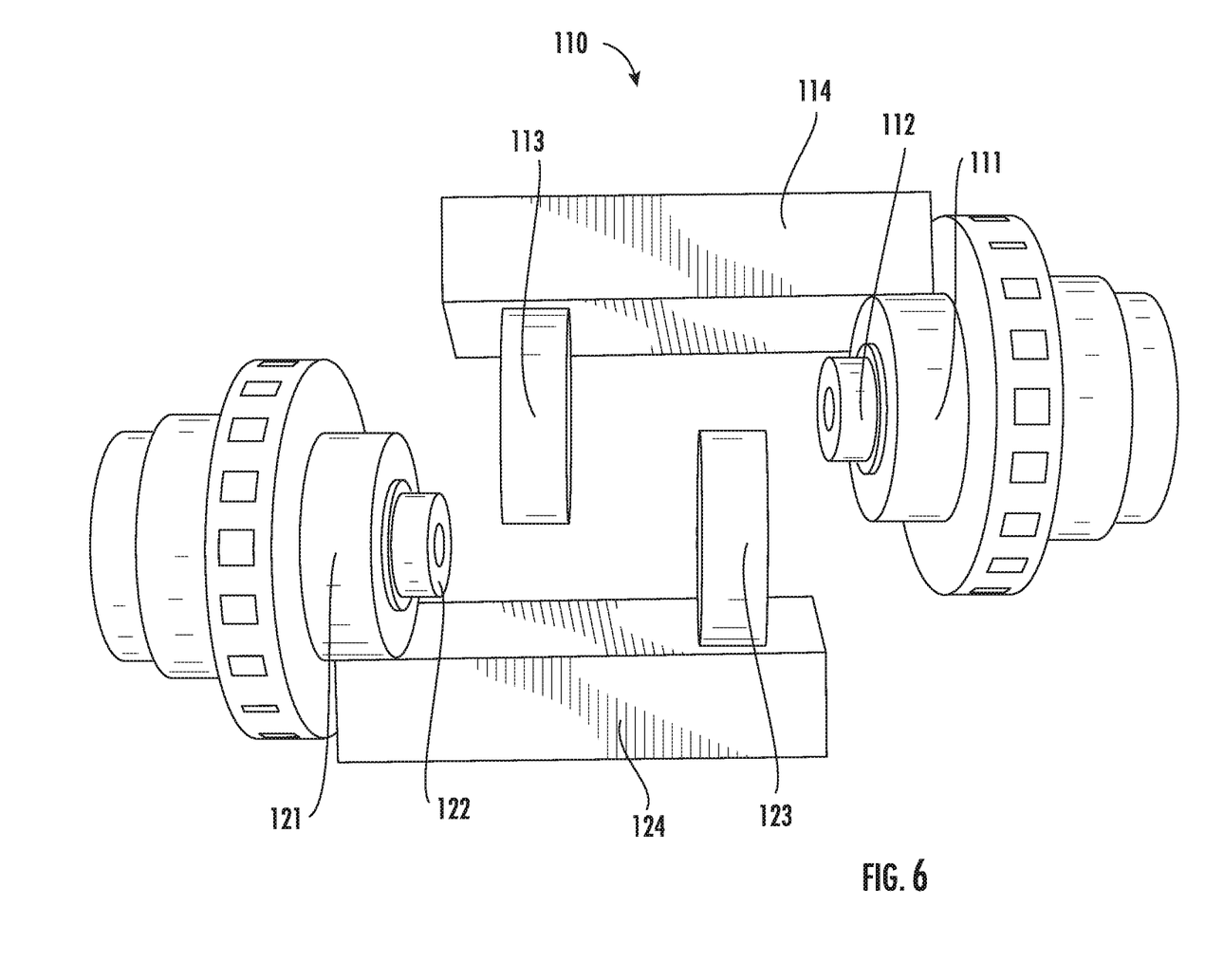
FIG. 6 is an exploded side view of two rotor assemblies of the exemplary circular force generator.

In some embodiments, as illustrated in FIGS. 1A, 1B, and 6, the elements of CFG device 100 are arranged such that second rotor assembly 120 is inverted relative to first rotor assembly 110 and interleaved with first rotor assembly 110 for rotation together about shaft 102. As illustrated in FIGS. 1A and 1B, such an arrangement involves first rotor assembly 110 and second rotor assembly 120 being positioned such that first eccentric mass 114 and second eccentric mass 124 are each aligned with and extend parallel to a common portion of shaft 102. In some embodiments, first rotor assembly 110 includes a first phase-shifting bearing 113 connected to first eccentric mass 114 and rotatably coupled to second rotor assembly 120 at or near second position P2, and a second phase-shifting bearing 123 is connected to second eccentric mass 124 and rotatably coupled to first rotor assembly 110 at or near first position P1. In the embodiments illustrated in FIGS. 1B, 2, and 6, first rotor assembly 110 includes a first collar 112 attached to first spinning bearing 111 or otherwise positioned at or near first position P1, where second phase-shifting bearing 123 is configured to be mounted about first collar 112. Second rotor assembly 120 similarly includes a second collar 122 attached to second spinning bearing 121 or otherwise positioned at or near second position P2, where first phase-shifting bearing 113 is configured to be mounted about second collar 122. In this arrangement, first phase-shifting bearing 113 and second phase-shifting bearing 123 help to couple first rotor assembly 110 and second rotor assembly 120 together and maintain the two elements at a desired relative axial position while allowing relative rotation between first eccentric mass 114 and second eccentric mass 124. In addition, in some embodiments, where first eccentric mass 114 extends away from first spinning bearing 111 in first direction D1 and second eccentric mass 124 extends away from second spinning bearing 121 in second direction D2, the eccentric masses are effectively coupled to the corresponding spinning bearings in a cantilevered arrangement. In such an arrangement, first phase-shifting bearing 113 and second phase-shifting bearing 123 help to remove the radial torque from the spinning bearings.

In such embodiments, although the interleaved rotor assemblies include four radial bearings, only first spinning bearing 111 and second spinning bearing 121 spin at operating speed, while first phase-shifting bearing 113 and second phase-shifting bearing 123 are selectively rotatable at comparatively low speeds and only during circular force magnitude changes. In some embodiments, first spinning bearing 111 and second spinning bearing 121 bear the radial load of the generated circular force, while first phase-shifting bearing 113 and second phase-shifting bearing 123 bear the remainder of the centrifugal rotor forces. In this way, continuous power consumption and bearing drag is minimized by reducing the number of spinning bearings as well as the loads they carry.

In some embodiments, second rotor assembly 120 has a shape and configuration that is identical or substantially identical to the shape and configuration of first rotor assembly 110. In some embodiments, this similarity or identity involves one or more of a size of second spinning bearing 121, a size of second phase-shifting bearing 123, an axial length of second eccentric mass 124, or a radius of second eccentric mass 124 being the same or substantially similar to a size of first spinning bearing 111, a size of first phase-shifting bearing 113, an axial length of first eccentric mass 114, or a radius of first eccentric mass 114, respectively. Such a configuration allows first rotor assembly 110 and second rotor assembly 120 to be interchangeable, with the only difference between the two elements being their relative arrangement within CFG device 100. Thus, in some embodiments, first rotor assembly 110 and second rotor assembly 120 can be identified by the same part number.

Regardless of the particular configuration of first rotor assembly 110 and second rotor assembly 120, the centers of mass of first eccentric mass 114 and second eccentric mass 124 are both positioned between first position P1 and second position P2. In some embodiments, the centers of mass rotate in substantially coplanar paths. That is, a first center of mass M1 of first eccentric mass 114 rotates in a first path about shaft 102, a second center of mass M2 of second eccentric mass 124 rotates in a second path about shaft 102, and the first path and the second path are substantially coplanar. Because of this substantial alignment of the centers of mass of the two rotor assemblies, the rotation of first eccentric mass 114 and second eccentric mass 124 do not generate a rotating moment.

A relative angular position between first eccentric mass 114 and the second eccentric mass is selectively adjustable to change a magnitude and a phase of the combined rotating force. In some embodiments, first motor 115 and second motor 125 are independently operable such that a speed of one of the motors can be selectively changed on at least a transient basis to cause first eccentric mass 114 and second eccentric mass 124 to rotate relative to one another. In this regard, if one of first motor 115 or second motor 125 is operated at a speed that is slightly faster than a nominal speed and the other of second motor 125 or first motor 115 is operated slightly slower than the nominal speed, first eccentric mass 114 and second eccentric mass 124 are correspondingly moved either closer together or further apart. The total effective eccentricity of the rotating system is thus adjustable to achieve a desired magnitude and phase of the rotating force generated. For example, the eccentric masses are rotatable to a neutral state in which first eccentric mass 114 is positioned opposite of shaft 102 from second eccentric mass 124. Alternatively, the eccentric masses are rotatable to a maximum eccentricity state in which first eccentric mass 114 and second eccentric mass 124 are adjacent to one another on one side of shaft 102. Further, the eccentric masses are rotatable to any of a variety of intermediate positions between the neutral state and the maximum eccentricity state to achieve a desired rotating force magnitude and phase. Once the desired eccentricity is achieved, first motor 115 and second motor 125 are operable at the same speed such that first rotor assembly 110 and second rotor assembly 120 co-rotate about shaft 102 at the same frequency.

Figure 5:
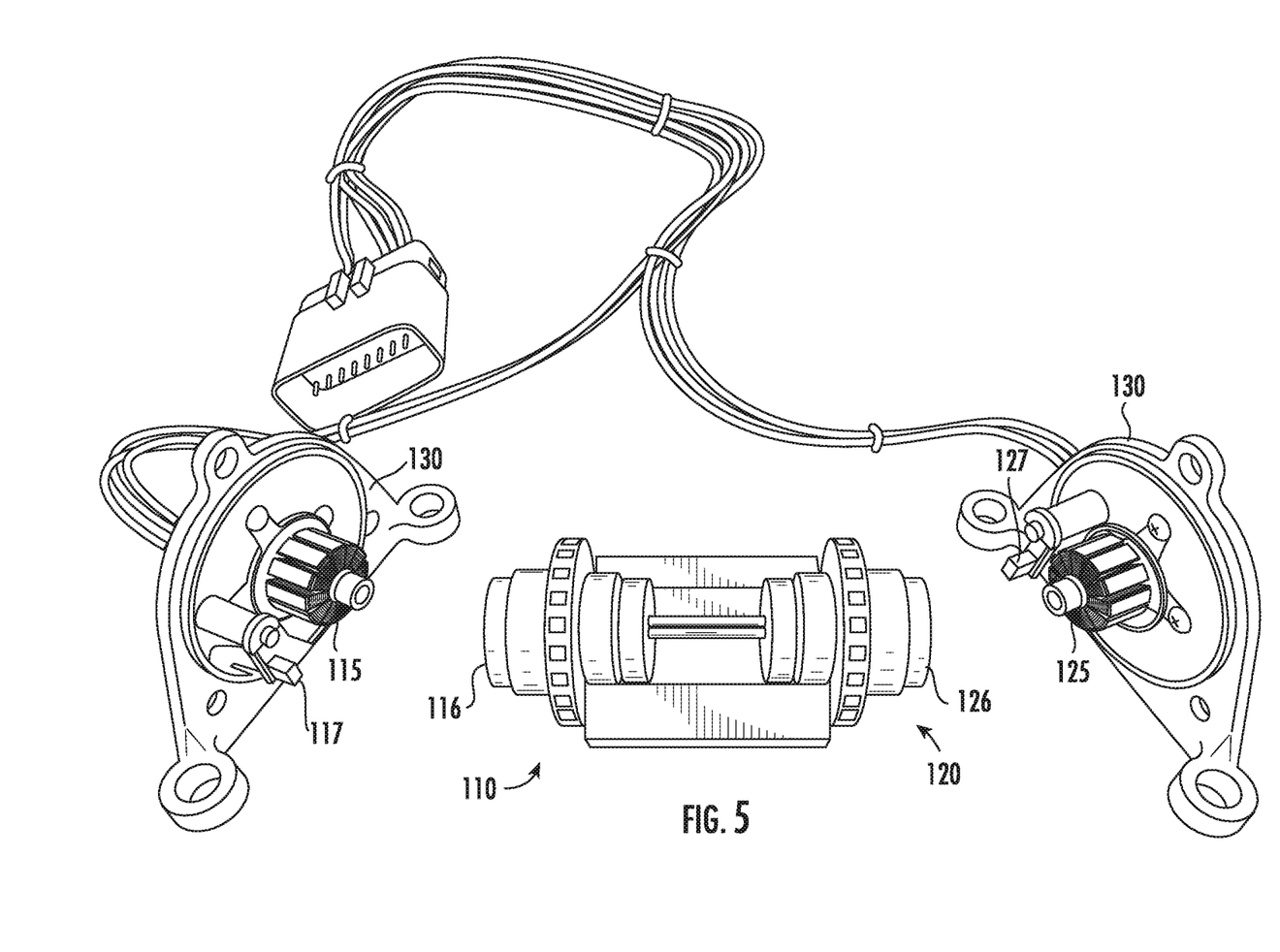
FIG. 5 is a partially exploded top view of the exemplary circular force generator.
Figure 7:
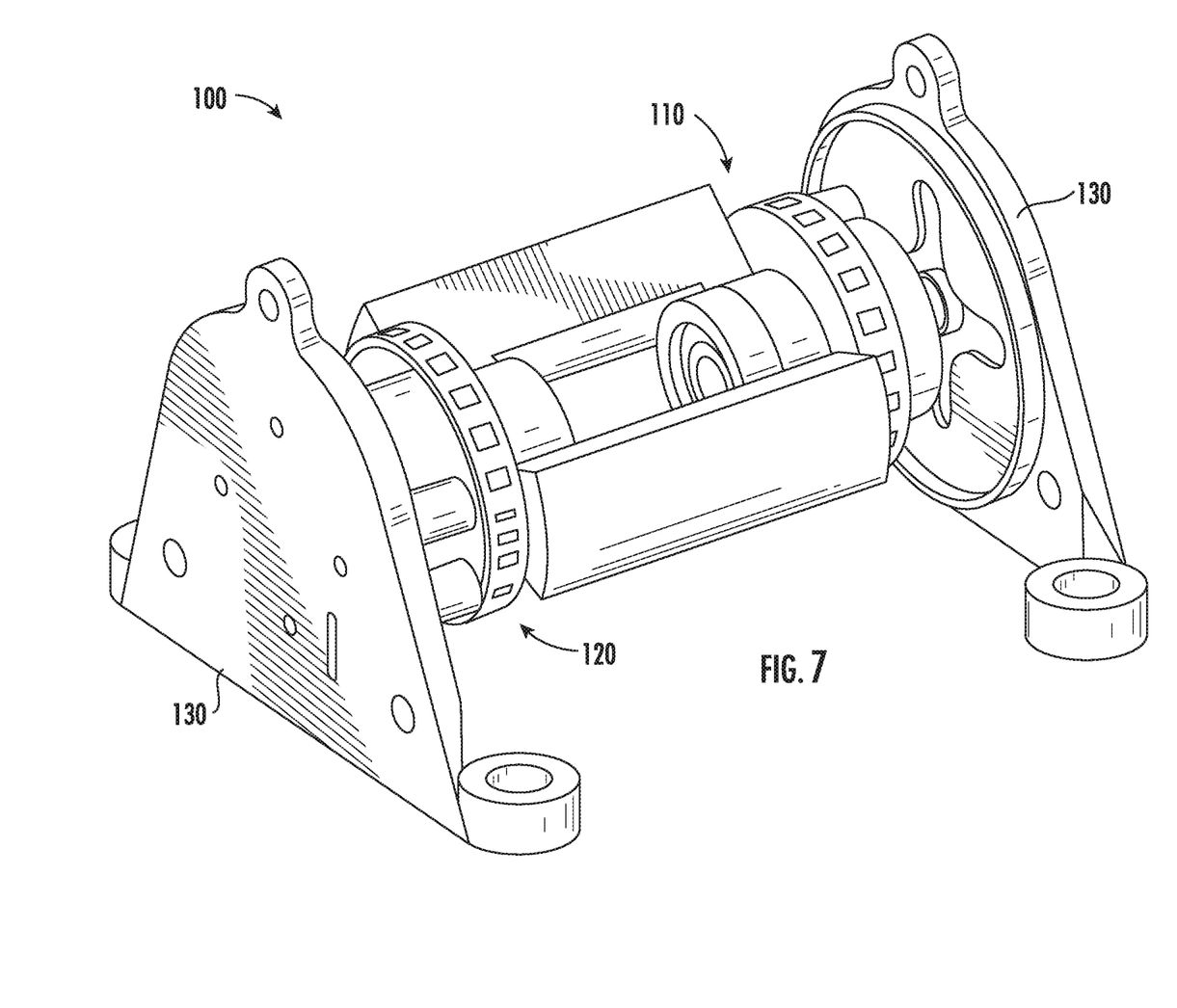
FIG. 7 is a perspective side view of the exemplary circular force generator mounted in a housing.

Referring to FIGS. 5 and 7, in some embodiments, first rotor assembly 110 and second rotor assembly 120 are mounted within a housing 130, which is configured to be connected to a frame of a vehicle for which vibration is to be controlled. In some embodiments, one or more of shaft 102, a first motor stator of first motor rotor 116, first sensor 117, a second motor stator of second motor rotor 126, and/or second sensor 127 are mounted to housing 130.

Regardless of the particular configuration, first eccentric mass 114 and second eccentric mass 124 are each rotatable about shaft 102 to generate a combined rotating force. In some embodiments, such a configuration for CFG device 100 generates 200 N of force thru 40 Hz to 90 Hz range. The configuration is easily scalable, however, such that the dimensions of first eccentric mass 114 and second eccentric mass 124 are adjustable to achieve a required force. For example, further configurations of CFG device 100 can be designed to generate 100 N of force is approximately half the size of a 200 N CFG.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A circular force generator comprising:
    a first rotor assembly comprising:
        a first spinning bearing mounted about a shaft at a first position; and
        a first eccentric mass extending in a first axial direction away from the first position; and
    a second rotor assembly comprising:
        a second spinning bearing mounted about the shaft at a second position that is spaced apart in the first axial direction from the first position; and
        a second eccentric mass extending in a second axial direction away from the second position, wherein the second axial direction is opposite the first axial direction;
    wherein the first eccentric mass and the second eccentric mass are each rotatable about the shaft to generate a combined rotating force;
    wherein a first phase-shifting bearing is connected to the first eccentric mass and is rotatably coupled to the second rotor assembly at or near the second position;
    wherein a second phase-shifting bearing is connected to the second eccentric mass and is rotatably coupled to the first rotor assembly at or near the first position;
    wherein the first phase-shifting bearing and the second phase-shifting bearing allow relative rotation between the first eccentric mass and the second eccentric mass; and
    wherein a relative angular position between the first eccentric mass and the second eccentric mass is selectively adjustable to change a magnitude and a phase of the combined rotating force.

2. The circular force generator of claim 1, wherein a first center of mass of the first eccentric mass rotates in a first path about the shaft, wherein a second center of mass of the second eccentric mass rotates in a second path about the shaft, and wherein the first path and the second path are substantially coplanar.

3. The circular force generator of claim 1 comprising:
    a first motor coupled to the first rotor assembly and configured to drive rotation of the first eccentric mass about the shaft; and
    a second motor coupled to the second rotor assembly and configured to drive rotation of the second eccentric mass about the shaft.

4. The circular force generator of claim 3, wherein the first motor comprises a first frameless annular motor coupled to the first rotor assembly;
    wherein the first rotor assembly comprises a first position sensor in communication with the first rotor assembly and configured to identify a position of the first eccentric mass with respect to the shaft;
    wherein the second motor comprises a second frameless annular motor coupled to the second rotor assembly; and
    wherein the second rotor assembly comprises a second position sensor in communication with the second rotor assembly and configured to identify a position of the second eccentric mass with respect to the shaft.

5. The circular force generator of claim 1 wherein the second rotor assembly has a shape and configuration that is identical to a shape and configuration of the first rotor assembly.

6. A circular force generator comprising:
    a first rotor assembly comprising:
        a first spinning bearing mounted about a shaft at a first position;
        a first eccentric mass extending in a first axial direction away from the first position; and
        a first phase-shifting bearing connected to the first eccentric mass at a second position that is spaced apart in the first axial direction from the first position; and
    a second rotor assembly comprising:
        a second spinning bearing mounted about the shaft at or near the second position and rotatably coupled to the first phase-shifting bearing;
        a second eccentric mass extending in a second axial direction away from the second position, wherein the second axial direction is opposite the first axial direction; and
        a second phase-shifting bearing connected to the second eccentric mass and rotatably coupled to the first spinning bearing at or near the first position;
    wherein the first eccentric mass and the second eccentric mass are each rotatable about the shaft to generate a combined rotating force;
    wherein a first center of mass of the first eccentric mass rotates in a first path about the shaft, wherein a second center of mass of the second eccentric mass rotates in a second path about the shaft, and wherein the first path and the second path are substantially coplanar; and
    wherein the first phase-shifting bearing and the second phase-shifting bearing allow for selective adjustment of a relative angular position between the first eccentric mass and the second eccentric mass to change a magnitude and a phase of the combined rotating force.

7. The circular force generator of claim 6 comprising:
    a first motor coupled to the first rotor assembly and configured to drive rotation of the first eccentric mass about the shaft; and
    a second motor coupled to the second rotor assembly and configured to drive rotation of the second eccentric mass about the shaft.

8. The circular force generator of claim 7, wherein the first motor comprises a first frameless annular motor coupled to the first rotor assembly;
    wherein the first rotor assembly comprises a first position sensor in communication with the first rotor assembly and configured to identify a position of the first eccentric mass with respect to the shaft;
    wherein the second motor comprises a second frameless annular motor coupled to the second rotor assembly; and
    wherein the second rotor assembly comprises a second position sensor in communication with the second rotor assembly and configured to identify a position of the second eccentric mass with respect to the shaft.

9. The circular force generator of claim 6 wherein the second rotor assembly has a shape and configuration that is identical to a shape and configuration of the first rotor assembly.

10. A method of generating a circular force, the method comprising:
    mounting a first rotor assembly about a shaft, the first rotor assembly comprising:
        a first spinning bearing mounted about the shaft at a first position; and
        a first eccentric mass extending in a first axial direction away from the first position;
    mounting a second rotor assembly about the shaft, the second rotor assembly comprising:

a second spinning bearing mounted about the shaft at a second position that is spaced apart in the first axial direction from the first position; and a second eccentric mass extending in a second axial direction away from the second position, wherein the second axial direction is opposite the first axial direction;

rotating the first eccentric mass and the second eccentric mass about the shaft to generate a combined rotating force; and adjusting a relative angular position between the first eccentric mass and the second eccentric mass to change a magnitude and a phase of the combined rotating force;

wherein mounting the first rotor assembly to the shaft comprises rotatably coupling a first phase-shifting bearing that is connected to the first eccentric mass to the second rotor assembly at or near the second position;

wherein mounting the second rotor assembly to the shaft comprises rotatably coupling a second phase-shifting bearing that is connected to the second eccentric mass to the first rotor assembly at or near the first position; and wherein the first phase-shifting bearing and the second phase-shifting bearing allow relative rotation between the first eccentric mass and the second eccentric mass.

11. The method of claim 10, wherein a first center of mass of the first eccentric mass rotates in a first path about the shaft, wherein a second center of mass of the second eccentric mass rotates in a second path about the shaft, and wherein the first path and the second path are substantially coplanar.

12. The method of claim 10, wherein rotating the first eccentric mass comprises driving rotation of the first eccentric mass about the shaft by a first motor coupled to the first rotor assembly; and wherein rotating the second eccentric mass comprises driving rotation of the second eccentric mass about the shaft by a second motor coupled to the second rotor assembly.

13. The method of claim 12, wherein the first motor comprises a first frameless annular motor coupled to the first rotor assembly;

wherein the first rotor assembly comprises a first position sensor in communication with the first rotor assembly and configured to identify a position of the first eccentric mass with respect to the shaft;

wherein the second motor comprises a second frameless annular motor coupled to the second rotor assembly; and wherein the second rotor assembly comprises a second position sensor in communication with the second rotor assembly and configured to identify a position of the second eccentric mass with respect to the shaft.

* * * * *